US008868720B1

(12) United States Patent
Nair et al.

(10) Patent No.: US 8,868,720 B1
(45) Date of Patent: Oct. 21, 2014

(54) DELEGATION OF DISCOVERY FUNCTIONS IN INFORMATION MANAGEMENT SYSTEM

(75) Inventors: Manoj Nair, Cary, NC (US); Stephen R. Perrin, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 141 days.

(21) Appl. No.: 11/864,596

(22) Filed: Sep. 28, 2007

(51) Int. Cl.
*G06F 15/173* (2006.01)

(52) U.S. Cl.
USPC .......................................... 709/224; 718/104

(58) Field of Classification Search
CPC .............. G06F 9/46; G06F 7/00; G06F 17/00
USPC .......................................... 709/224; 718/104
See application file for complete search history.

(56) References Cited

U.S. PATENT DOCUMENTS

| | | | |
|---|---|---|---|
| 6,003,040 A | 12/1999 | Mital et al. | |
| 6,167,445 A * | 12/2000 | Gai et al. | 709/223 |
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 * | 8/2002 | Brunet et al. | 709/223 |
| 6,591,300 B1 | 7/2003 | Yurkovic | |
| 6,633,312 B1 | 10/2003 | Rochford et al. | |
| 6,865,728 B1 | 3/2005 | Branson et al. | |
| 7,185,073 B1 | 2/2007 | Gai et al. | |
| 7,240,076 B2 | 7/2007 | McCauley et al. | |
| 7,278,156 B2 | 10/2007 | Mei et al. | |
| 7,363,292 B2 | 4/2008 | Chaboche | |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,565,656 B2 | 7/2009 | Yamasaki et al. | |
| 7,580,357 B2 | 8/2009 | Chang et al. | |
| 7,613,806 B2 * | 11/2009 | Wright et al. | 709/225 |
| 7,616,642 B2 | 11/2009 | Anke et al. | |
| 7,640,345 B2 | 12/2009 | Nair et al. | |
| 7,725,570 B1 | 5/2010 | Lewis | |
| 7,725,571 B1 | 5/2010 | Lewis | |
| 7,730,172 B1 | 6/2010 | Lewis | |

(Continued)

FOREIGN PATENT DOCUMENTS

EP 1855218 A2 11/2007
WO WO 2008/036621 3/2008

OTHER PUBLICATIONS

U.S. Appl. No. 11/692,051, filed Mar. 27, 2007, Perrin et al.
U.S. Appl. No. 11/692,058, filed Mar. 27, 2007, Perrin et al.

(Continued)

*Primary Examiner* — Frantz Jean
(74) *Attorney, Agent, or Firm* — Workman Nydegger

(57) ABSTRACT

Environment and/or file discovery operations are delegated by an information management service in a network to external computing resources. The external computing resource performs discovery operations to discover objects in the network, which may include discovering every object in the network, or discovering only new, changed, and/or deleted objects in the network. Discovery information identifying the discovered objects is reported back to the information management service. The information management service uses the discovery information to perform information management, including classification of discovered objects into categories, mapping categories to service level objectives that include one or more services, and orchestrating execution of the one or more services. Optionally, the information management service can delegate classification, service level management, and/or orchestration of services to one or more additional external computing resources.

18 Claims, 4 Drawing Sheets

(56) References Cited

U.S. PATENT DOCUMENTS

| | | | |
|---|---|---|---|
| 7,734,765 B2 | 6/2010 | Musman et al. | |
| 7,739,239 B1 | 6/2010 | Cormie et al. | |
| 7,895,220 B2 | 2/2011 | Evans et al. | |
| 7,953,740 B1 | 5/2011 | Vadon et al. | |
| 8,069,435 B1 | 11/2011 | Lai | |
| 8,104,080 B2 | 1/2012 | Burns et al. | |
| 8,548,964 B1* | 10/2013 | Nair et al. | 707/694 |
| 2002/0016800 A1 | 2/2002 | Spivak et al. | |
| 2002/0091746 A1 | 7/2002 | Umberger et al. | |
| 2002/0120685 A1 | 8/2002 | Srivastava et al. | |
| 2002/0161883 A1* | 10/2002 | Matheny et al. | 709/224 |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0093528 A1 | 5/2003 | Rolia | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0212778 A1 | 11/2003 | Collomb | |
| 2003/0225829 A1 | 12/2003 | Pena et al. | |
| 2003/0233391 A1 | 12/2003 | Crawford et al. | |
| 2003/0233464 A1 | 12/2003 | Walpole et al. | |
| 2003/0236904 A1 | 12/2003 | Walpole et al. | |
| 2004/0060002 A1 | 3/2004 | Lucovsky et al. | |
| 2004/0098415 A1 | 5/2004 | Bone et al. | |
| 2004/0215650 A1 | 10/2004 | Shaji et al. | |
| 2004/0236660 A1 | 11/2004 | Thomas et al. | |
| 2004/0243699 A1 | 12/2004 | Koclanes et al. | |
| 2005/0060662 A1 | 3/2005 | Soares et al. | |
| 2005/0071182 A1 | 3/2005 | Aikens et al. | |
| 2005/0102297 A1 | 5/2005 | Lloyd et al. | |
| 2005/0125768 A1* | 6/2005 | Wong et al. | 717/100 |
| 2005/0132034 A1 | 6/2005 | Iglesia et al. | |
| 2005/0177545 A1 | 8/2005 | Buco et al. | |
| 2005/0197852 A1 | 9/2005 | Gebhard et al. | |
| 2005/0251533 A1 | 11/2005 | Harken et al. | |
| 2005/0262097 A1 | 11/2005 | Sim-Tang et al. | |
| 2005/0273451 A1 | 12/2005 | Clark et al. | |
| 2005/0289216 A1 | 12/2005 | Myka et al. | |
| 2006/0015388 A1 | 1/2006 | Flockhart et al. | |
| 2006/0036463 A1 | 2/2006 | Patrick et al. | |
| 2006/0039364 A1 | 2/2006 | Wright | |
| 2006/0092861 A1* | 5/2006 | Corday et al. | 370/256 |
| 2006/0095543 A1 | 5/2006 | Ito et al. | |
| 2006/0095570 A1 | 5/2006 | O'Sullivan | |
| 2006/0101084 A1 | 5/2006 | Kishi et al. | |
| 2006/0106782 A1 | 5/2006 | Blumenau et al. | |
| 2006/0112108 A1 | 5/2006 | Eklund et al. | |
| 2006/0114832 A1 | 6/2006 | Hamilton et al. | |
| 2006/0129974 A1 | 6/2006 | Brendle et al. | |
| 2006/0179143 A1 | 8/2006 | Walker et al. | |
| 2006/0236061 A1 | 10/2006 | Koclanes | |
| 2006/0248165 A1 | 11/2006 | Sridhar et al. | |
| 2006/0248187 A1 | 11/2006 | Thorpe et al. | |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0083875 A1 | 4/2007 | Jennings | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0162749 A1 | 7/2007 | Lim | |
| 2007/0192352 A1 | 8/2007 | Levy | |
| 2007/0208751 A1 | 9/2007 | Cowan et al. | |
| 2007/0214208 A1 | 9/2007 | Balachandran | |
| 2007/0226228 A1 | 9/2007 | Her et al. | |
| 2007/0260640 A1 | 11/2007 | Hamilton et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1 | 1/2008 | Irle et al. | |
| 2008/0049642 A1* | 2/2008 | Gudipudi et al. | 370/254 |
| 2008/0059387 A1 | 3/2008 | Vaidhyanathan et al. | |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0077682 A1 | 3/2008 | Nair et al. | |
| 2008/0077995 A1 | 3/2008 | Curnyn et al. | |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0301760 A1 | 12/2008 | Lim | |
| 2009/0077210 A1 | 3/2009 | Musman et al. | |
| 2009/0150431 A1 | 6/2009 | Schmidt et al. | |
| 2009/0157881 A1 | 6/2009 | Kavuri et al. | |
| 2010/0250497 A1 | 9/2010 | Redich et al. | |
| 2013/0110840 A1 | 5/2013 | Nair et al. | |

OTHER PUBLICATIONS

U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/528,783, Jan. 15, 2010, Office Action.
U.S. Appl. No. 11/528,772, Sep. 12, 2008, Pre-Interview First Office Action.
U.S. Appl. No. 11/528,772, Dec. 22, 2008, First Action Interview.
U.S. Appl. No. 11/528,772, Jun. 3, 2009, Final Office Action.
U.S. Appl. No. 11/528,772, Jan. 28, 2010, Office Action.
U.S. Appl. No. 11/528,783, Nov. 7, 2008, Pre-Interview First Office Action.
U.S. Appl. No. 11/528,783, Feb. 24, 2009, Office Action.
U.S. Appl. No. 11/528,783, Jun. 25, 2009, Final Office Action.
U.S. Appl. No. 11/692,058, Jan. 8, 2010, Final Office Action.
U.S. Appl. No. 11/528,898, Sep. 5, 2008, Pre-Interview First Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,898, Oct. 7, 2009, Final Office Action.
U.S. Appl. No. 11/528,900, Jun. 9, 2008, Office Action.
U.S. Appl. No. 11/528,900, Jan. 23, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/694,753, Mar. 25, 2009, Office Action.
U.S. Appl. No. 11/694,753, Nov. 18, 2009, Final Office Action.
U.S. Appl. No. 11/694,783, Feb. 6, 2009, Office Action.
U.S. Appl. No. 11/692,051, Aug. 26, 2009, Office Action.
U.S. Appl. No. 11/694,764, Jan. 28, 2010, Office Action.
U.S. Appl. No. 11/772,179, Aug. 19, 2009, Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/694,753, Mar. 29, 2010, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/772,179, Feb. 23, 2010, Final Office Action.
U.S. Appl. No. 11/864,770, Apr. 21, 2010, Final Office Action.
U.S. Appl. No. 11/772,192, Apr. 15, 2010, Office Action.
U.S. Appl. No. 11/864,760, Apr. 7, 2010, Final Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,058, Jul. 6, 2010, Office Action.
U.S. Appl. No. 11/694,753, Oct. 5, 2010, Final Office Action.
U.S. Appl. No. 11/694,764, Aug. 4, 2010, Final Office Action.
U.S. Appl. No. 11/864,605, May 28, 2010, Final Office Action.

(56) References Cited

OTHER PUBLICATIONS

U.S. Appl. No. 11/864,760, Jul. 27, 2010, Office Action.
U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,764, Jan. 27, 2011, Office Action.
U.S. Appl. No. 11/694,753, Jun. 17, 2011, Final Office Action.
U.S. Appl. No. 11/864,774, May 11, 2011, Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 13/414,512, Mar. 14, 2014, Final Office Action.
U.S. Appl. No. 13/719,084, Jul. 26, 2013, Office Action.
U.S. Appl. No. 13/719,084, Jan. 6, 2014, Notice of Allowance.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 11/864,774, Apr. 15, 2013, Notice of Allowance.
U.S. Appl. No. 13/414,512, Aug. 1, 2013, Office Action.
U.S. Appl. No. 11/528,790, Jan. 10, 2014, Final Office Action.
U.S. Appl. No. 11/864,770, Nov. 26, 2013, Office Action.
U.S. Appl. No. 11/864,764, Nov. 20, 2013, Office Action.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/772,179, Nov. 13, 2012, Final Office Action.
U.S. Appl. No. 11/864,605, Nov. 8, 2012, Final Office Action.
U.S. Appl. No. 11/864,770, Feb. 4, 2013, Office Action.
U.S. Appl. No. 11/864,764, Dec. 10, 2012, Final Office Action.
U.S. Appl. No. 11/772,179, Oct. 11, 2013, Office Action.
U.S. Appl. No. 11/772,192, Aug. 12, 2013, Notice of Allowance.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,790, May 8, 2014, Notice of Allowance.
U.S. Appl. No. 13/972,089, Apr. 16, 2014, Notice of Allowance.
U.S. Appl. No. 11/528,772, Oct. 27, 2011, Notice of Allowance.
U.S. Appl. No. 11/528,783, Feb. 10, 2012, Office Action.
U.S. Appl. No. 11/528,790, Jan. 23, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,192, Jan. 5, 2012, Office Action.
U.S. Appl. No. 11/864,770, Apr. 19, 2011, Final Office Action.
U.S. Appl. No. 11/864,764, Aug. 29, 2011, Final Office Action.
U.S. Appl. No. 11/864,774, Dec. 9, 2011, Final Office Action.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Office Action.
U.S. Appl. No. 11/772,192, Jun. 12, 2012, Final Office Action.
U.S. Appl. No. 11/864,605, Jul. 3, 2012, Office Action.
U.S. Appl. No. 13/414,512, filed Mar. 7, 2012, Nair et al.
U.S. Appl. No. 11/528,898, Mar. 1, 2012, Office Action.
U.S. Appl. No. 11/772,179, Mar. 29, 2012, Office Action.
U.S. Appl. No. 11/864,764, May 3, 2012, Office Action.

\* cited by examiner

DELEGATION OF DISCOVERY FUNCTIONS IN INFORMATION MANAGEMENT SYSTEM

CROSS-REFERENCE TO RELATED APPLICATIONS

Not applicable.

BACKGROUND OF THE INVENTION

1. The Field of the Invention

The present invention relates to information management. More particularly, embodiments of the invention relate to systems and methods for delegating discovery functions of an information management system in a computing environment.

2. The Relevant Technology

The world is slowly and continually moving from being paper-based to being electronic-based and this is becoming apparent in a wide variety of different systems. Businesses, schools, and even home life are transitioning to electronic systems. For example, email is becoming a primary means of communication rather than sending regular mail. Bills are paid online. Airlines often prefer electronic ticketing and online check-in. The list goes on. There are several reasons for this transition, one of which is the convenience and accessibility of electronic systems. Email, for example, often arrives shortly after sending it.

As entities become more centered on electronic data, the ability to manage the electronic data becomes crucial for a wide variety of different reasons. Much of the electronic data maintained by an entity or organization often relates to different aspects of the entity and often is subject to various considerations.

Further, much of the data is unstructured at least in the sense that the data's value to the entity is not readily known and the services required for the data are not necessarily known. For example, an entity may have a file storage system that it backs up on a regular basis. However, there may be many files on the file storage system that have little or no value to the entity. As a result, the entity is often paying for services that are not required. Further, there may be files that contain certain information that subjects those files to certain regulations. Because the content of those files is unknown, the files are not receiving adequate services, thereby subjecting the entity to potential liability.

More generally, there are a number of different factors that may determine how certain data is handled or that determine the services that are needed for the data. Some of the factors or considerations include data security, data backup, data retention, data access control, regulatory compliance, corporate compliance, and the like or any combination thereof.

Various information management systems and methods exist, some of which may address these and other factors and considerations. Notably, however, the amount of electronic data that can be managed by an information management system is often limited by the physical limits of the hardware implementing the information management system. For instance, an information management server is necessarily limited in the amount of electronic data it can manage by, among other things, its processors and other hardware. Thus, the scalability of an information management system is an important consideration for entities desiring to implement information management in a network.

Two conventional scaling solutions often implemented include scaling up and scaling out. Scaling up, for example, includes implementing the information management system in a server with faster hardware. Often, however, the cost of scaling up can be prohibitively high. Scaling out involves replicating the information management server and distributing the work across the resulting server instances, with each server instance managing a subset of a network, or partitioning/separating out low-level information management functions to other servers. In the case of the former, the use of multiple information management servers can present integration difficulties and in the case of the latter, high-level functions not partitioned to the other servers still require significant computing resources from the information management server.

In sum, the data of an entity is an important asset and should be properly safeguarded. This means that services such as backup, retention, encryption, etc., need to be obtained and orchestrated such that entities have neither too little nor too many services for their data. Furthermore, conventional information management systems do not offer entities sufficient scalability. As a result, these entities are forced to implement non-optimized scaling solutions when they exceed the physical limits of their information management systems. Entities need a way to manage their data so as to comply with all relevant requirements without purchasing too many services and without providing insufficient services. Entities also need a way to scale their information management systems as conditions in the entity change.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
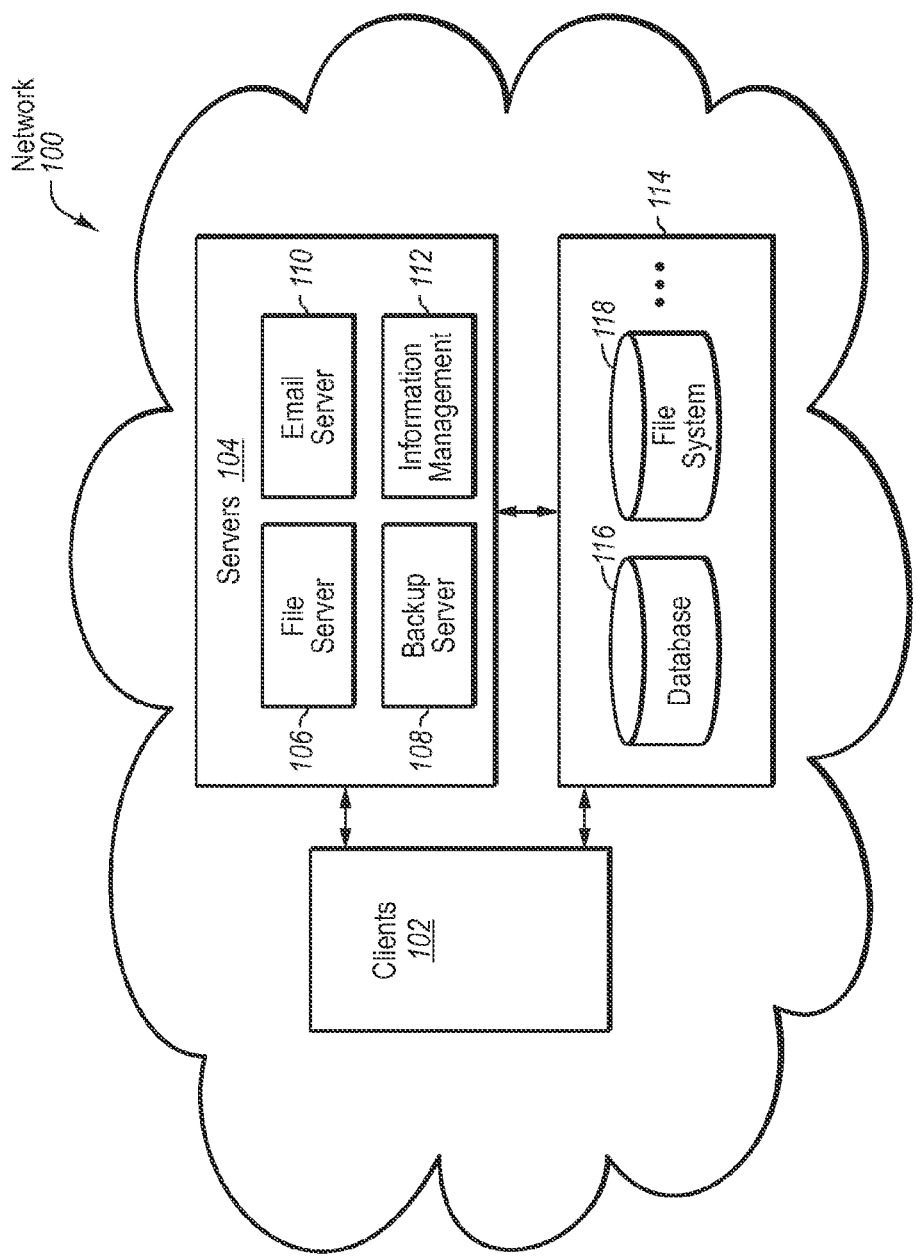
FIG. 1 illustrates an exemplary environment for implementing embodiments of the invention.

Embodiments of the invention relate to information or data management and more particularly to systems and methods for delegating information management processing operations, such as environment and file discovery, to external computing resources. The delegation of processing operations to external computing resources increases the scalability of the information management service.

I. Information Management

Information management can be implemented in a variety of different computer or computing systems. A computer system, by way of example only, may refer to a single computer and/or to multiple computers (including clients and/or server computers, and other devices) that are connected with a network. Objects of a computer system can include servers, applications, services, data, files, and the like or any combination thereof.

Implementing information management in accordance with the present invention requires an understanding of the computer system or of servers operating on the computer system, services operating on the computer system, and of the data (files, information, emails, etc.) that exists in or is accessible by clients, servers, and services on the computer system. This knowledge can be obtained through discovery of the computer system, which provides the information management system with an understanding of the relationships that may exist between the various servers (and other devices) on the computer system and the data that is accessible over the computer system. The discovery of a computer system provides the information management system with information that can be used to classify the computer system and the data in the computer system.

After the computer system (infrastructure and data) has been discovered, it is useful to classify the data that is in the computer system. Classification is a process that enables each object to be grouped with other objects or to be examined in a manner that enables the needed services for that object to be identified. For example, all objects that need a particular service may be grouped. Alternatively, embodiments of the invention enable each object to be categorized and classified individually. As a result, the service needs of each object are considered. Thus, the groupings identified herein are distinct from coarse groupings that fail to consider the service needs of the objects individually. An object can be any data (e.g., file), server, service, application or the like in the network. Classification typically assigns each object to one or more categories. If available, information management enables each object to receive the services that each object requires. More commonly, services are typically provided in packages. As a result, the service level objects as identified by the assigned categories are often matched to the best available service package. Embodiments of the invention, however, are not so limited.

Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather than pay for services that may not be needed. Further, unstructured data is categorized and can be provided with the services based on its value to the entity. In one embodiment, classification is a way for an entity to automatically place a value on the various objects of data.

Information management is also a process that can be ongoing. In most computer systems, objects are continually added and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

II. Network Environment

FIG. 1 illustrates an example environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a network is not limited to the data objects in the network but also includes discovery of the servers and services that are operating in the network. An understanding of the servers and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database 116 can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, a marketing and sales share, and the like. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

III. Information Management in a Networked Environment

Information management according to embodiments of the invention has several components that work together to provide an understanding of the value of an entity's information. In some instances, the entity itself can provide or define some of the logic or rules that are used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for those objects reflect the entity's perception of the objects' worth.

For example, an entity may want to retain objects that were authored by a particular person for a long time. A rule to that effect that is processed for the objects of the entity can then help classify the objects in an automated manner and the entity is assured that all objects that satisfy that requirement are receiving the appropriate services. More generally, an information management system can examine all business objectives for files, not just one at a time. For example, some of the files authored by a particular person may contain personal data on employees who have left the entity. Such files often fall under laws that require their destruction after a certain time period. Thus, some of the files authored by the person may need to be retained for a shorter length of time due to a more pressing consideration (e.g., regulations). One embodiment of information management can thus consider both the desire to retain files written by the author and consider regulations at the same time, for each object. Embodiments of information management can recognize conflicting service goals, as in this example, and then resolve the conflict. At the same time, some of the business objects may be additive. For instance, the entity may also desire to index all files written by the specific person.

Information management also reduces various risks (such as non-compliance) often associated with unstructured data. As described below, embodiments of the invention provide a system for classifying data such that the appropriate services can be provided to the entity's data. Embodiments of the invention also enable services that are required by an entity to be effectively identified and orchestrated. Examples of the services often required by entities includes backup services, retention services, corporate compliance services, regulatory compliance, data accessibility, data deletion, and the like or any combination thereof.

Methods and systems for managing information in a computer system are disclosed in greater detail in U.S. patent application Ser. No. 11/528,900, filed Sep. 27, 2006 and entitled "Information Management," which application is incorporated herein by reference in its entirety.

Figure 2:
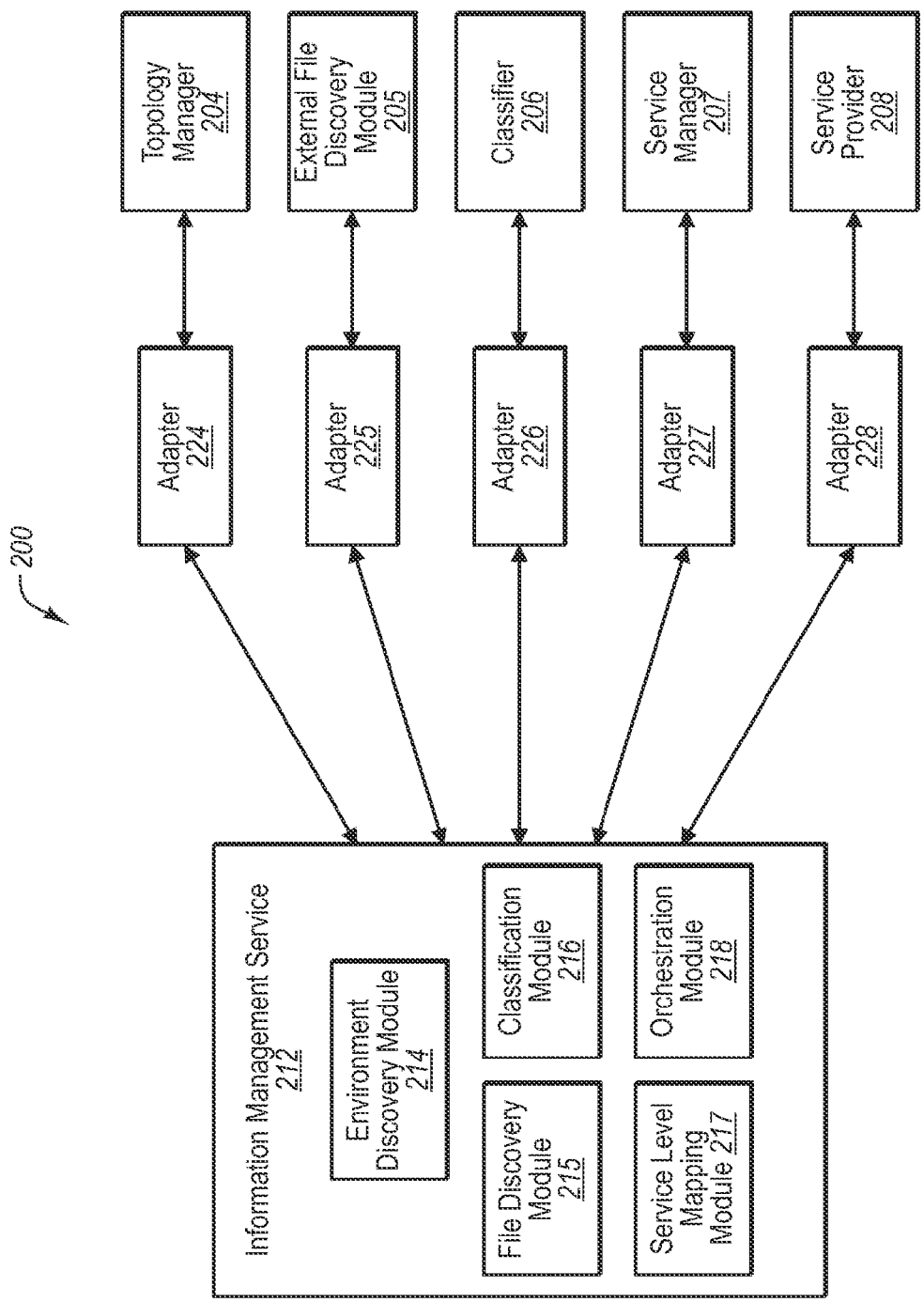
FIG. 2 illustrates one embodiment of a system for delegating information management processing operations in a network.

Turning now to FIG. 2, an example system 200 for information management of data including unstructured data files or objects is illustrated. The system 200 typically includes an information management service 212 communicably connectable to one or more intelligent managers 204, 205, 206, 207 and 208. According to one embodiment of the invention, the information management service 212 is installed in and operates on one server (e.g., an information management server) while the intelligent managers 204-208 are installed in and operate on one or more computing resources external to the information management server (e.g., external computing resources).

The information management service 212 comprises a plurality of information management modules 214-218, including an environment discovery module 214, a file discovery module 215, a classification module 216, a service level mapping module 217 and an orchestration module 218. Each of the information management modules 214-218 and the information management processing operations performed by each will be described in turn.

A. Discovery in Information Management

Discovery is often the first element of information management. According to embodiments of the invention, discovery includes both a discovery of the environment/infrastructure using the environment discovery module 214 and a discovery of data in the network using the file discovery module 215.

The environment discovery module 214 can be used, for example, to discover all IP devices on the computer system 100 of FIG. 1 that appear to act as a server. In addition to discovering these servers, the environment discovery module 214 can discover services as well. The environment discovery module 214 can also discover devices, applications that offer services, what kinds of service each offers, and what levels of service or capabilities are supported by that service provider. According to one embodiment, after performing an initial environmental discovery on the computer system 100, the environment discovery module 214 can monitor the system 100 and identify any environmental changes on a regular and/or irregular basis, such as weekly or immediately upon detecting a change.

The file discovery module 215 can be used, for example, to discover all data residing in the system 100. According to one embodiment, the file discovery module 215 identifies modified and/or new data in the system 100 on a regular and/or irregular basis.

The discovery of the objects in a computer system, such as the system 100, can be done in a variety of ways. The discovery of the environment/infrastructure, for example, may involve an examination or analysis of all IP addresses existing in a network. Devices that act as a server can thus be identified. Once these servers are identified, additional information can then be sought from those servers. Applications can also be identified. For example, many entities often have a payroll application that includes a software program working in conjunction with a database. The database can be examined and may have certain table or logs when acting, for example, as source for payroll. The traffic on the network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other data or objects.

Methods and systems for discovering objects in a computer system are disclosed in greater detail in U.S. patent application Ser. No. 11/694,753, filed Mar. 30, 2007 and entitled "Environment Classification And Service Analysis," which application is incorporated herein by reference in its entirety.

B. Classification in Information Management

Classification is typically the next step in information management and may be performed by a classification module 216. Classification is the process of identifying or associating data or objects with categories. One result of classification is to associate objects being classified with certain categories. More particularly, the information collected during discovery by the environment discovery module 214 and/or file discovery module 215 can be used during classification. The resulting categories assigned to objects in the computer system can be used in subsequent parts of information management as described below.

Classification, however, is not limited to the information collected during discovery. Classification can also include, for example, applying sets of rules to the objects in a network. The rules can be default rules or rules that are selected according to a line of business of the entity or for any other reason. For example, objects that include social security numbers may have to be retained for some period of time per governmental regulations. Alternatively, objects whose owner is a member of marketing may only be retained for a few years, but may require full indexing.

In addition to applying rules to the objects of the entity, classification also includes the generation of metadata as well as the use of existing metadata. Generated metadata includes values that are derived from information objects rather than having been collected during discovery. For example, hash values can be generated and then used to identify duplicate objects. Another example of generated metadata is the case where the objects are examined for specified keywords and/or patterns. The generated metadata, or metadata derived from an object being analyzed, are useful during the classification process.

Existing metadata, on the other hand, can be collected from the objects or from the environment. For example, the owner, size, share, etc., of an object can be collected and used to automatically categorize an object. The collected metadata (such as file owner) can be used by rules to categorize the content of the object or the object itself. In some embodiments, a particular object may be associated with more than one category.

In another embodiment, aging considerations can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

Methods and systems for classifying objects in a computer system are disclosed in greater detail in U.S. patent application Ser. No. 11/528,772, filed Sep. 27, 2006 and entitled "Information Classification," which application is incorporated herein by reference in its entirety.

C. Service Level Management in Information Management

After the objects have been categorized during classification, service level objectives can then be identified for the various objects by the service level mapping module 217, which can also perform the other functions identified herein. A category can be mapped through configuration data to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic.

In other words, the classification module 216 has already assigned categories to each of the objects. During the classification process, some of the various categories are assigned to each object as applicable. These categories can then be used by the service level mapping module 217 to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time.

In this manner, the service level mapping module 217 processes the object that has been classified (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually provided from service providers. If the service level objectives do not match or are not satisfied by the best matching actual service package, then a service gap is present.

The use of packages is often used by some entities that manage some or all of their services by restricting the offerings to a number of supported combinations of service levels. In other words, the particular combination of service level objects may not represent a supported package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration is the process by which the services are orchestrated. Orchestration may involve finding the best service provider for each service. Orchestration can automate multiple service actions and translate an end user service level request to provider action. The workflows needed to execute the services are coordinated during orchestration by the orchestration module 218.

IV. Delegation of Information Management Functions

Many of the information management processing operations described herein and performed by the information management modules 214-218 require a significant amount of processing power from the information management server executing the information management service 212. Consequently, the network size that can be efficiently managed by the information management service is necessarily limited by the processing capabilities of the information management server. However, embodiments of the invention contemplate the delegation of one or more discovery operations (environment discovery and file discovery) and optionally one or more other information management operation (e.g., classification, service level management, and orchestration of services) to one or more of the intelligent managers 204-208. This offloads work from the information management server, enabling the information management service to manage relatively larger networks.

Accordingly, a topology manager 204 can be provided for performing environment/infrastructure discovery, a file manager or external file discovery module 205 can be provided for performing file discovery; a classifier 206 can be provided for performing classification, a service manager 207 can be provided for performing service level mappings, and a service provider 208 can be provided for execution of orchestrated services. As previously mentioned, these intelligent managers 204-208 are installed in and operate on one or more external computing resources, thereby reducing the processing power required by the information management service 212.

The information management service 212 delegates the intelligence required to perform the information management processing operations to the intelligent managers 204-208. In this manner, the intelligent managers 204-208 can provide high-level data to the information management service 212 that the information management service 212 can use in coordinating each of the intelligent managers 204-208. For instance, rather than constantly or periodically monitoring the environment/infrastructure of the system 100 to identify changes, the information management service 212 provides instructions to do so to the topology manager 204. When the topology manager 204 identifies changes in the environment/structure of the system 100, the topology manager 204 can notify the information management service 212 of the changes. Similarly, the external file discovery module 205 can receive instructions to monitor files and other data and can report collected information (including identified files and metadata about the files) back to the information management service 212.

It is contemplated by the invention that one or more of the intelligent managers 204-208 may be configured differently than the information management service 212. For this reason, the information management service 212 may communicate with one or more of the intelligent managers 204-208 using adapters 224-228. In effect, the adapters 224-228 translate communications between the intelligent managers 204-208 and the information management service 212. Thus, the intelligent managers 204-208 can communicate directly with the information management service 212 in a common language, or the intelligent managers 204-208 can communicate through adapters 224-228 in different languages.

By delegating one or more discovery operations and optionally other information management operations (e.g., classification, service level management, orchestration of services) to the intelligent managers, the total amount of data that can be managed by the information management service 212 increases while the amount of processing power required to manage a given amount of data decreases.

Figure 3:
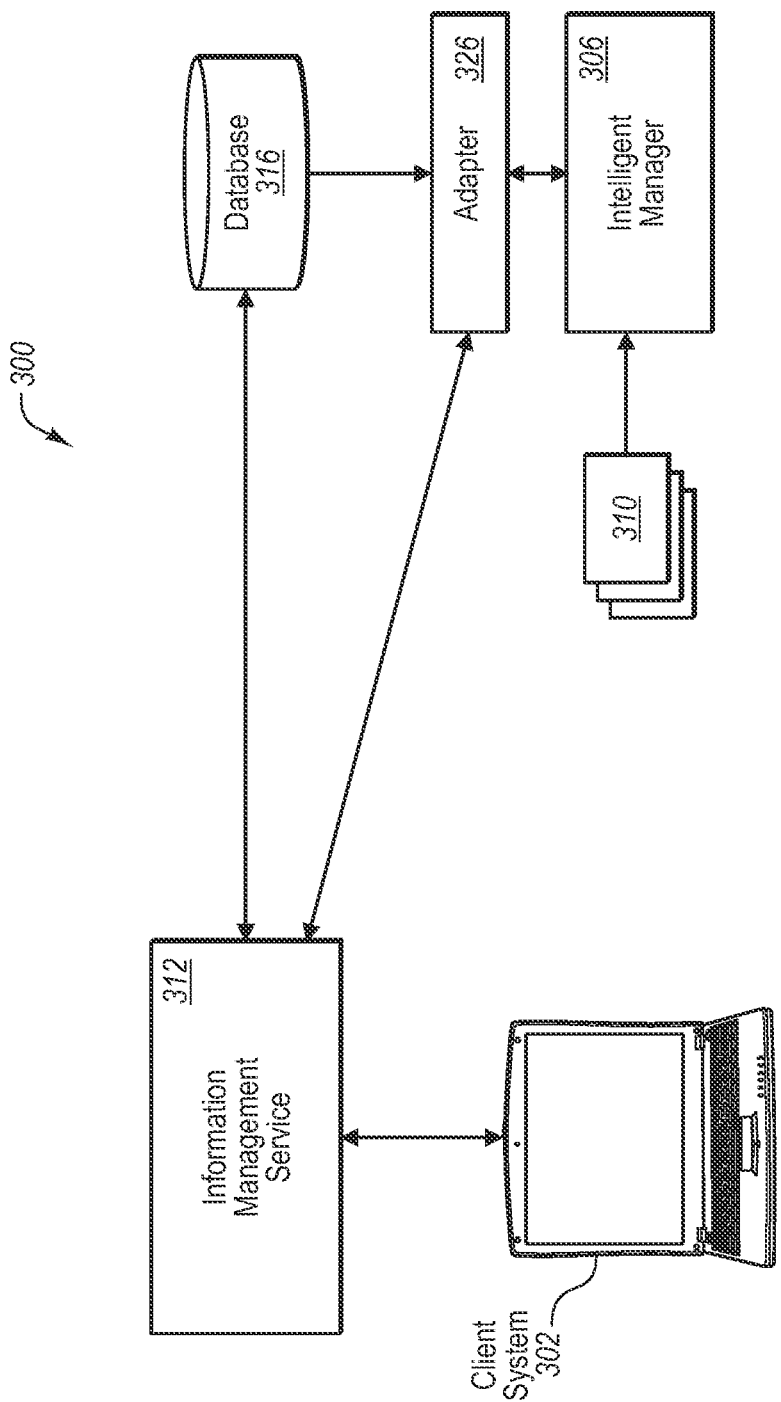
FIG. 3 illustrates another embodiment of a system for delegating information management processing operations.

With reference now to FIG. 3, an example system 300 for delegating particular information management processing operations to an intelligent manager is illustrated. The system 300 includes an information management service 312 for managing data, a client system 302 for configuring the information management service 312, a database 316 for storing configuration data, and an intelligent manager 306 for performing one or more processing operations. In particular, the intelligent manager 306 may be a topology manager (and/or external file discovery module), corresponding to the topology manager 204 (and/or external file discovery module 205) of FIG. 2. Optionally, the information management service 312 may communicate with the topology manager 306 using an adapter 326.

The information management service 312 is provided in a network environment and configured through a user interface such as a client computer 302. A system administrator or other user can use the client computer 302 to specify configuration data for the information management service 312, including rules to apply during the classification process (such as attributes and content to look for and applicable categories based on attributes and content), applicable service levels for given categories, and/or policies to implement during the orchestration process. For example, configuration data may specify that if certain content (e.g., the term "medical") is found in an object with certain attributes (e.g., having extension ".doc"), the object belongs to a certain category (e.g., HIPAA files), requiring a certain service level (e.g., three year retention). The policies implemented during the orchestration process may require that files within the HIPAA category be moved between different tiers of storage at various stages in their lifecycles.

While the configuration data (e.g., rules, service levels, policies, etc.) can be user-specified, default configuration data can also be used. In another embodiment of the invention, the information management service 312 can include a plurality of user-selectable configurations. Each of the user-selectable configurations can be directed to a particular industry, such as healthcare, legal, energy, high tech, etc. Typically, the configuration data—whether user-specified or default—is stored in the database 316.

The instructions (which may include configuration data and/or intelligence) necessary for performing environment discovery operations are provided to the topology manager 306. If the topology manager 306 does not share a common language with the information management service 312, an adapter 326 can be provided to the topology manager 306 to translate the instructions for the topology manager 306 and to translate the discovery information generated by the topology manager 306 for the information management service 312. Optionally, the database 316 can include a library of adapters such that the information management service can delegate the discovery process to any one of a plurality of classifiers.

In operation, the information management service 312 instructs the topology manager 306 to perform environment discovery, which may include providing configuration data to the topology manager. In some embodiments, the topology manager 306 may lack intelligence and may simply discover and report every environment object to the information management service 312. In other embodiments, the topology manager 306 receives intelligence from the information management service to discover and report only the changes (e.g., new, modified, and/or deleted environment objects) in the network. The topology manager 306 can discover and report file servers, applications, service providers, as well as the characteristics of the discovered file servers, applications, and service providers, and the like or any combination thereof. Examples of service providers or services include backup servers, file movers, encryption servers, and the like.

After performing discovery, the topology manager 306 reports discovery information to the information management service 312, the discovery information identifying objects in the network. This discovery information can be used to manage objects in the network, such as by driving file discovery, classification, or any other information management operation. For instance, if the environment discovery identifies a new or modified file server, the information management system can then discover files and other data objects on the file server during file discovery. Alternately or additionally, the information management system 312 can delegate file discovery to an external file discovery module.

Accordingly, delegation of discovery operations can alternately or additionally include delegation of file or information discovery to an external file discovery module, such as the file manager 205 of FIG. 2, which can also be represented by the intelligent manager 306 in FIG. 3. In this case, the information management service 312 instructs the external file discovery module 306 to perform file discovery, which may include providing the external file discovery module 306 with configuration data and/or intelligence. For instance, the information management service 312 may instruct the external file discovery module 306 to monitor a particular file share. The external file discovery module 306 may lack intelligence and/or may simply discover and report every data object in the file share or it can discover and report only the changes (e.g., new, modified, and/or deleted data objects) in the file share using intelligence. The external file discovery module 306 collects discovery information that can include an identification of files 310 and other data on a particular file share or file server, as well as information or metadata about the files (such as owner, date created, date modified, and the like).

The discovery information is reported to the information management system 312 and can be used to manage objects in the network, such as by driving classification or other information management operations (such as service level management and/or orchestration of services). Thus, in one embodiment, the information management system 312 receives the discovery information, classifies the identified objects to assign one or more categories, maps the assigned categories to service level objectives that identify services, and orchestrates execution of the services. Alternately or additionally, classification, service level mapping, and/or orchestration can be delegated to one or more external resources, similar to the delegation of discovery. In either case, the information management service coordinates and synchronizes all of the information management processing operations.

According to one embodiment of the invention, the information management service 312 delegates one or more discovery operations and optionally one or more other information management operations to one or more intelligent managers and monitors the one or more intelligent managers to ensure that they are properly performing the operations delegated to them. Optionally, the information management service can delegate monitoring operations to a supervisory intelligent manager. In this case, the information management service 312 can monitor a single intelligent manager (e.g., the supervisory intelligent manager) rather than monitoring a plurality of intelligent managers.

Figure 4:
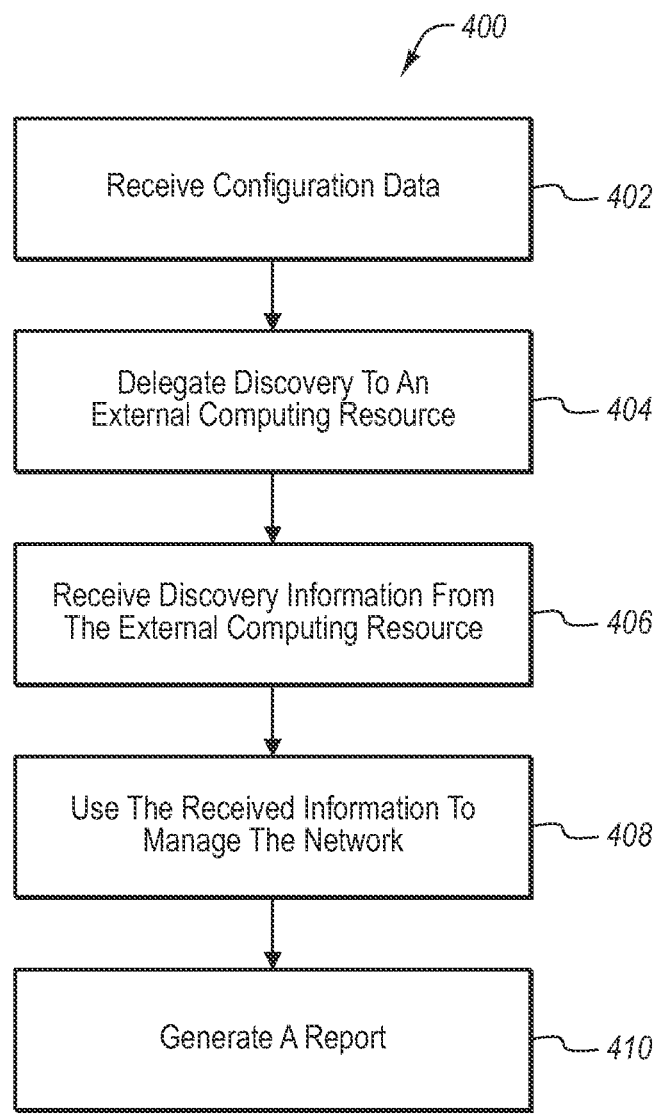
FIG. 4 illustrates an embodiment of a method for delegating an information management processing operation to an external computing resource.

A method 400 for delegating one or more discovery operations to one or more intelligent managers will now be described with respect to FIGS. 3 and 4. The method 400 begins by receiving 402 configuration data for an information management service 312 in a network. The configuration data 402 may be stored in a database 316. Receiving the configuration data 402 may include receiving user input (i.e., through a client computer 302) configuring the information management service 312.

After receiving the configuration data, the information management service 312 delegates 404 the intelligence required to perform a discovery operation to an external computing resource. Delegating the intelligence can include providing all or a subset of the configuration data to an intelligent manager 306. Delegating the intelligence can further include providing an adapter to the intelligent manager 306 such that the intelligent manager understands the configuration data received from the information management service 312 in the event the intelligent manager 306 and the information management service 312 do not share a common language. Alternately or additionally, step 404 may comprise delegating one or more discovery operations to an external computing resource by instructing the external computing resource to perform the one or more discovery operations. Thus, an external computing resource may or may not require intelligence to perform one or more delegated discovery operations.

The method 400 continues by receiving 406 discovery information from the intelligent manager 306 after the intelligent manager performs the discovery operation delegated to it. As used herein, discovery information identifies objects in the network (e.g., data, servers, services, and/or applications) as well as characteristics of the objects, and can be received from, e.g., a topology manager and/or external file discovery module. Optionally, the received discovery information can be stored by the information management service 312 in the database 316.

The information management service 312 can use 408 the discovery information received from the intelligent manager to manage the network, which may include using the discovery information to drive file discovery (such as when the received discovery information includes environment discovery information only), classification, service level mapping, and/or orchestration of services. Alternately or additionally, the discovery information can be provided to an additional external computing resource to perform file discovery, classification, and the like if these operations have also been delegated.

Finally, the method 400 can include using the received discovery information to generate 410 a report. Advantageously, this permits a system administrator or other user to, for example, identify the types of services currently being provided and the specific data for which such identified services are being provided. This enables a user to make better decisions about how data is stored. Thus, the user can change service levels or at least be aware of services being provided to the data.

Information management enhances the ability of a system to manage its unstructured data across domains or enhances the ability of users to manage their data including unstructured data, across varying lines of business, and by identifying services that best meet the system's or entity's requirements. Furthermore, delegating information management processing operations to external computing resources permits an information management system to efficiently manage more information than would be possible without the delegation.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In an information management service operating in a network, a method of improving information management efficiency, the method comprising:

an information management server offloading one or more information management operations by delegating the one or more information management operations to one or more external computing resources in a network, wherein the information management server provides intelligence to the one or more external computing resources to perform the one or more information management operations, wherein the one or more external computing resources perform the information management operations to collect information from objects in the network, the objects including at least data objects stored in the network;

the information management server receiving the collected information from the one or more external computing resources, the collected information identifying objects in the network;

the information management server identifying services for each object in the network, wherein the information management server uses the collected information to consider the objects individually when identifying the services; and the information management and the external computing resources providing information management for each object individually within the network, wherein providing the information management to the objects includes classifying each data object based at least on the collected information in at least one category, assigning service levels to each data object based on the assigned categories, and orchestrating the services for the objects within the network based on the assigned service levels.

2. The method of claim 1, wherein the intelligence includes instructions and instructs the external computing resource to discover and report changes in the network.

3. The method of claim 1, wherein delegating one or more discovery operations to one or more external computing resources includes providing configuration data to the one or more external computing resources, the configuration data including at least one of user-defined and default configuration data.

4. The method of claim 3, further comprising, providing an adapter to the one or more external computing resources such that the one or more external computing resources are able to implement the configuration data.

5. The method of claim 1, wherein the objects identified in the received information include one or more of data, applications, servers and services within the network.

6. The method of claim 1, wherein utilizing the received information to provide information management to the one or more objects within the network comprises one or more of:
using the received information to drive file discovery; and
using the received information to drive classification of the objects.

7. The method of claim 1, further comprising:
using the received information to classify the objects by assigning one or more categories to each object;
assigning service levels to the objects based on the categories assigned to each object; and
orchestrating the services for the objects based on the assigned categories, the assigned service levels, or both.

8. The method of claim 1, wherein the one or more operations comprise environment discovery, information discovery, or both.

9. The method of claim 8, wherein the one or more operations comprise at least environment discovery and the one or more external computing resources identify and collect information about one or more of: file servers, service providers, and characteristics of file servers and service providers, in the network.

10. The method of claim 9, wherein the service providers comprise one or more of backup servers, file movers, and encryption servers.

11. The method of claim 8, wherein the one or more operations comprise information discovery and the one or more external computing resources identify and collect information about one or more of files and metadata about the files.

12. An information management service server for managing information in a computing environment, the service server comprising:

a storage device including:
an environment discovery module configured for discovering the configuration and state of environment objects within the computing environment;
a classification module configured for categorizing objects, including the environment objects and data objects within the computing environment; and
an orchestration module configured for executing policies in regard to the categorized objects to manage services provided to at least the data objects, wherein instructions for performing a function of the environment discovery module and of the classification module are offloaded to an external computing source by delegating the function to the external computing resource device, wherein the external computing resource performs the instructions for the service server, wherein the server operates with the external computing source to perform information management based on results of the instructions performed by the external computing resource to at least identify services for each object individually in the network.

13. The service of claim 12, wherein the external computing resource comprises a second server.

14. The service of claim 12, wherein the service server monitors the external computing resource to ensure that the external computing resource performs the function.

15. The service server of claim 12, further comprising one or more of:
a file discovery module configured for discovering data objects within the computing environment; and a service level mapping module configured for assigning service levels to one or more of the objects based on the categories assigned to each object.

16. The service server of claim 15, wherein instructions for performing the function of the file discovery module are provided to an external computing resource such that the external computing resource can perform the function.

17. The service server of claim 12, further comprising an adapter for interfacing with the external computing resource.

18. The service server of claim 12, wherein environment objects include servers, services, and applications operating within the computing environment.

* * * * *